April 17, 1951     R. B. NOTTINGHAM     2,549,632
READER FOR THE BLIND

Filed Oct. 31, 1947     2 Sheets-Sheet 1

INVENTOR.
Ralph B. Nottingham
BY
Ebes J. Hyde
ATTORNEY

April 17, 1951     R. B. NOTTINGHAM     2,549,632
READER FOR THE BLIND

Filed Oct. 31, 1947     2 Sheets-Sheet 2

Patented Apr. 17, 1951

2,549,632

UNITED STATES PATENT OFFICE 2,549,632

READER FOR THE BLIND

Ralph B. Nottingham, Cleveland, Ohio, assignor to Gustave Theophile Louis Staar

Application October 31, 1947, Serial No. 783,337

3 Claims. (Cl. 35—35)

This invention pertains to a reader for the blind, of the general type shown, described and claimed in patent application Serial Number 743,695, filed April 24, 1947, in the name of Gustave Theophile Louis Staar, for a Reader for the Blind, and to whom the present application is assigned.

Briefly, the reader device set forth in the above-mentioned Staar application comprises a long narrow tape-like record member of paper or film on which are recorded a series of marks representative of a succession of letters and/or numerals, and a pickup device including six blunt-pointed pins arranged in a position similar to the positions of the six dots which form the basis of the Braille system. The pickup device includes six pickup elements, preferably of the optical type, one for each of the six dots utilized in the Braille system, and each pickup element controls the raising and lowering of one of the six pins above a planar surface on which the blind person's finger rests. As the record member is driven through the pickup drive, a succession of indicia representative of letters move past the optical pickup device and the six pins are raised against the reader's finger in combinations representative of the letters on the record member, thus presenting to the reader a succession of Braille letters.

The present invention pertains to means whereby the reader can utilize two or more fingers for the Braille letters. Through one finger the reader gets a "presense" of the letter which is to come. This permits the experienced Braille reader to read at an extremely high rate of speed.

An object of the invention is to provide a system of reading for the blind, preferably based on the Braille system, wherein a very rapid rate of reading may be achieved.

Another object of the invention is to provide a reading system for a blind person wherein the person may utilize several fingers simultaneously for sensing the letters.

Other objects and a fuller understanding of the invention may be had by referring to the following description and claims read in conjunction with the drawings, wherein:

The device comprises a long narrow record member carrying indicia representative of a succession of letters in combination with a device for reading the indicia comprising pickup means for sensing the indicia and means for driving the record member past the pickup means. An electric circuit is controlled by the pickup means in accordance with the indicia sensed by the pickup means, and there is a first and a second bank of plungers each comprised of a plurality of movable plungers. The plungers are actuated in accordance with electric current in said controlled electric circuit for indicating to the reader by the sense of feeling the succession of letters which pass the pickup means, and time delay means are provided for delaying the actuation of the second bank of plungers with respect to the actuation of the first bank of plungers.

Figure 1:
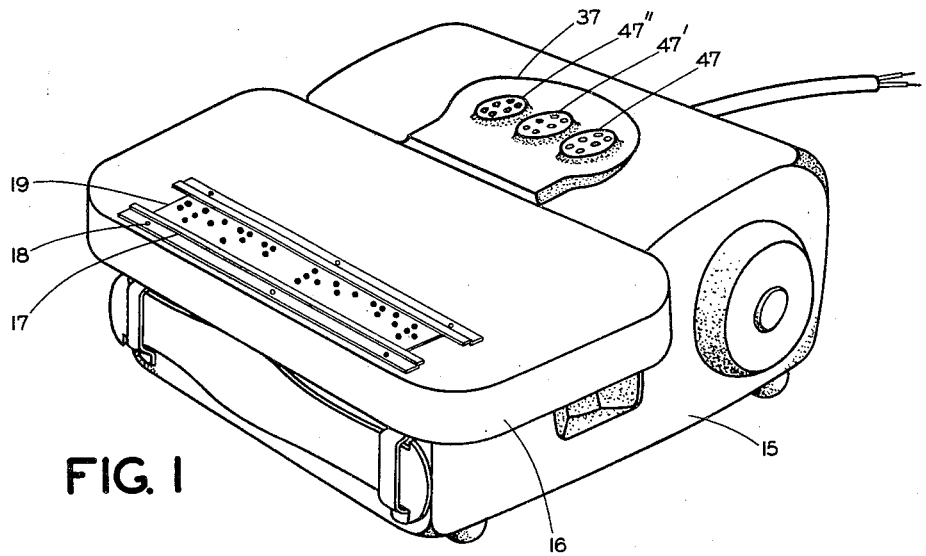
Figure 1 is an isometric view of a reader device for the blind embodying the invention.
Figure 2:
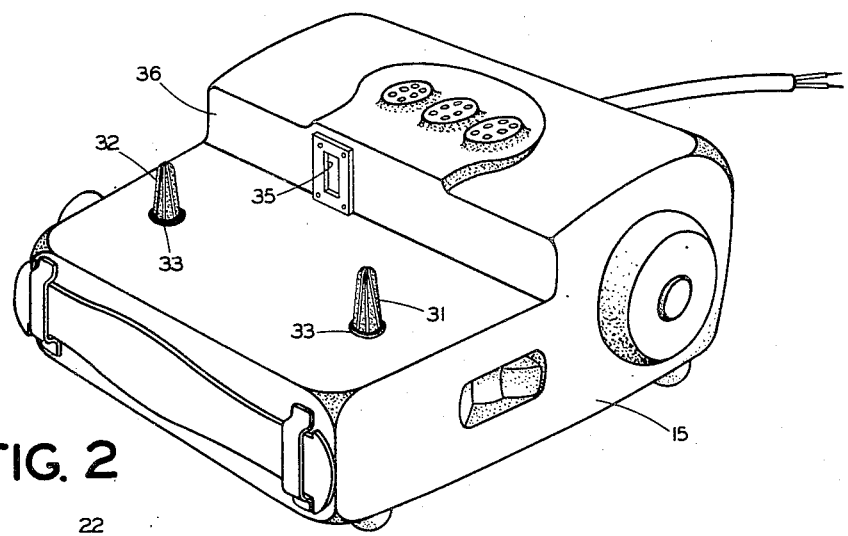
Figure 2 is an isometric view of the device shown in Figure 1 with the magazine portion thereof removed.

With reference to Figure 1 of the drawings the device is shown as comprising a reproducer identified by reference character 15 and a readily replaceable magazine 16 mounted on the reproducer ready for operation. The magazine has fastened to its top surface by rivets 18 an open-faced holder 17 into which a label 19 may be slipped. The label is embossed in regular Braille with the title of the literary work which is within the magazine so that the blind person may readily select the work that he desires from a large number of such magazines. A large library can be purchased and maintained by the average blind person because the cost of the reproducer is not high and any number of inexpensive magazines can be used with it, similar to the purchase of a phonograph and a large number of phonograph records.

Figure 3:
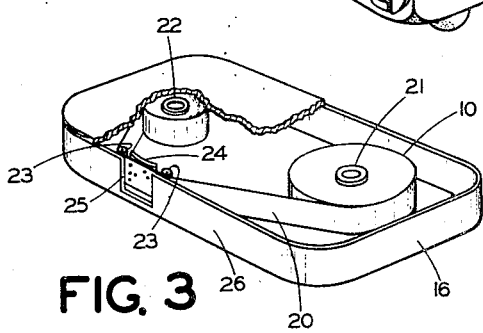
Figure 3 is an isometric, partially broken away, view of the magazine for the blind reader device.

Within the magazine 16 (shown in Figure 3) there is a long length of record material 20, such as paper, film, or the like, coiled in a first spiral 10 about a hollow spool 21, and adapted to be unwound from the first spiral into a second spiral about the spool 22. One end of the record material is preferably permanently connected to the spool 21 and the other end is permanently connected to the hollow spool 22. Thus the blind operator is spared the task of connecting the end of the record material to a spool upon each operation of the device. Connected to the case of the magazine are two guiding rollers 23 and an arcuate guide 24 which is spaced a slight distance away from an opening 25 in one edge 26 of the magazine 16. The record material 20 extends from the spiral 10 to the spool 22, and passes between the arcuate guide 24 and the opening 25, the guide rollers 23 serving to guide the material through the space therebetween.

When the magazine is in playing position on the reproducer 15, as is shown in Figure 1, driving spindles 31, 32 extend, respectively, into the hollow spools 21, 22 and splines 33 on the spindles lock with grooves in the hollow spools so that as the spindles 31, 32 turn under the driving power of motor, the two spools 21, 22 are rotated. In the "play-back" position the opening 25 in the edge 26 of the magazine registers with an opening 35 in a vertically extending portion 36 of the reproducer unit 15, and as the motor rotates the spools 21, 22 in a forward direction the record medium moves from right to left carrying successive indicia past the opening 35.

The indicia, indicated by reference character 38, corresponding to numbers and letters may be arranged on the record carrier 20 in accordance with Braille convention and may comprise a plurality of black dots printed on the paper, or black areas photographed on film or other light-sensitive material, as is well known in the sound-on-film art and as is shown in the aforementioned Staar application. Many other suitable arrangements are also shown in that application.

As is known the Braille system makes use of six raised dots to indicate different letters of the alphabet and to indicate different numbers. All six dots are not used for each letter. Thus, for example, the words "Blind Reader" are spelled out on the label 19 in Fig. 1. Reproduced on a larger scale the words "blind reader" appear as follows in Braille.

```
B L I N D   R E A D E R

```

It will be seen that certain letters like N and R require 4 dots, and it will be seen that the dots representing the letters lie in two columns of three positions each, though certain letters like B, L, A have dots which appear in only one of the two possible columns.

In order to reduce the length of the record member 20 it is preferable though not essential, to use only one column of dots having 6 possible positions for dots, as follows:

```
B L I N D   R E A D E R
```

Such an arrangement cuts to about one-half the required length of the record member 20, though it does increase its width. The increased width is not considered to be a disadvantage as the record member is made of thin, light-weight material and the added width gives it additional strength.

The letters in the words "Blind Reader" do not happen to illustrate the use of a dot in the sixth position. In Braille practice the sixth position is not used very much as it is associated with letters which are infrequently used.

Figure 4:
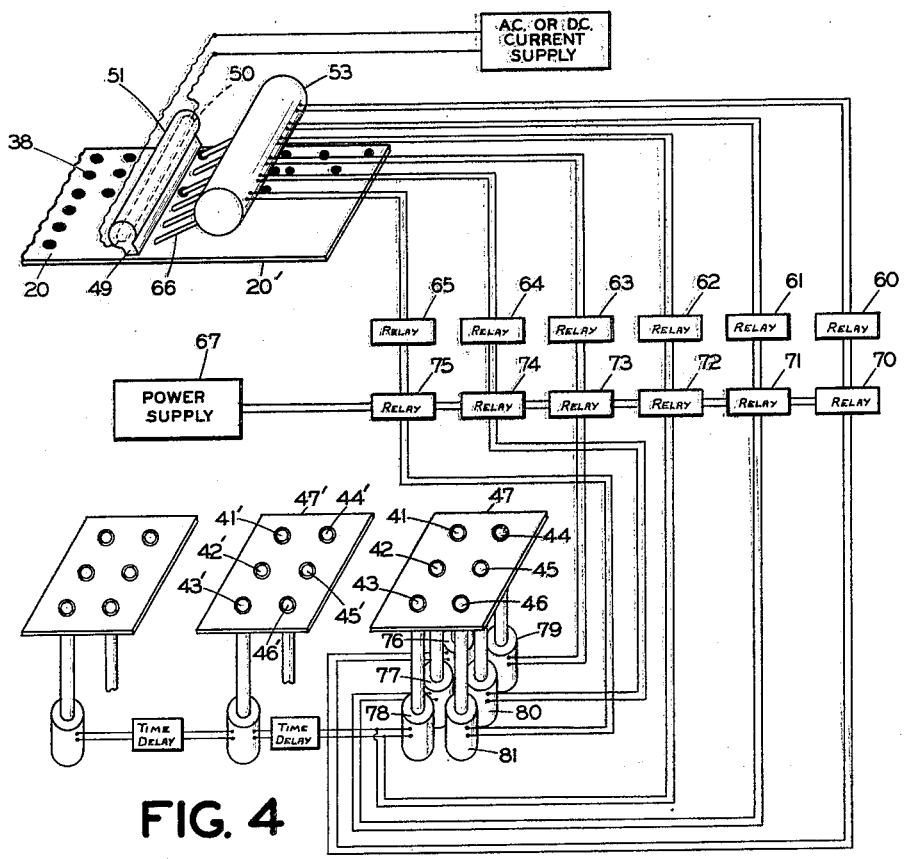
Figure 4 is a diagrammatic circuit of the device.

Within the reproducer unit 15 there is mounted a suitable system for reproducing the indicia and for actuating a plurality of banks of plungers, as is shown in Figure 4. The first bank of plungers comprises six blunt pointed pins or plungers 41, 42, 43, 44, 45, 46 which extend in a direction perpendicular to the perforated plate 47 and have their upper ends in six holes in the plates; and the second bank of plungers comprises pins or plungers 41', 42', 43', 44', 45' and 46', similarly mounted, with their ends in six holes in the plate 47'. Normally the end of each pin is just below the top surface of the plate with which it is associated but as an indicia 38 in a particular position on the record member 20' passes the opening 35 it causes, through the pickup system, the pin corresponding to its position in the first bank to be raised slightly above the surface of the plate 47 so that the blind person can feel it, and after a short time delay the corresponding pin is raised above the surface of the plate 47'. Thus, as the record material moves past the opening 35 the pins 41 to 46 and 41' to 46' each form successive Braille letters above the surface of the plates 47 and 47' corresponding to the successive indicia on the record member 20' which pass the pickup, and a blind person by holding a finger on the plates so that it covers the holes for the pins will be able to read the message recorded on the record member 20'.

By providing two or more banks of plungers which are similarly actuated by the indicia on the record member but with a slight time delay between the actuation of the successive banks of plungers it is possible to give to the reader an almost exact duplicate of what he feels when reading a Braille book. Experienced Braille readers often utilize two or more fingers on the Braille dots when reading, the leading fingers giving them a "presense" of the character to be sensed by a following finger. It is believed that it is this "presense" which permits the reader to read rapidly as the reader's brain sums up the impressions gained from his several fingers. The time delay between the finger station 47 indicating a given letter and the station 47' indicating the same letter remains in the reader's mind, giving an impression of having had the letter under his second finger for a longer length of time. Thus it is possible to drive the record member past the pickup means at an appreciably greater rate of speed.

One pickup system which may be used to reproduce the recorded indicia is of use with a record member which has portions of different light-reflecting qualities. For example, black dots on white paper, white dots on black paper, black dots on predominantly clear film or the like. The system is shown schematically in Figure 4, and comprises a light source 50, preferably of high intensity, positioned so that its light strikes the record medium 20' at an angle. The light is of considerable extension across the width of the record member, and the width of the light opening 49 in the reflector 51 should be about equal to the width of one "letter" on the record member. The light which reflects from the record member 20' is "picked up" by six photoelectric cells, all of which preferably are mounted within one envelope 53, and the output from each cell is used, respectively, to control one of six sensitive relays 60—65. Six short light-transmitting tubes 66 are positioned in order to efficiently transmit the light which reflects from the record member 20' directly to the photoelectric cells, and in order to effectively segregate the light so that each photocell is controlled only in accordance with the presence or absence of indicia in its particular portion of the record member. Thus the electrical output from each of the six photoelectric cells varies in accordance with the presence or absence of a dot in the particular lengthwise column of the record material which it is scanning, and the photocell output, through one of the sensitive relays 60—65 is used to control one of the relays 70—75 in the power supply line between the source of power 67 and one of the six solenoids 76—81. Each of the solenoids 76 to 81 is comprised of a hollow coil through which one of the pins 41—46 extends. Thus each of the pins can be made to extend a short distance up above the surface of the plate 47 in accordance with the presence of an indicia in a particular location on the record medium 20'. Of course, any of the well-known lens systems may be utilized with this electro-optic pickup in place of the light tubes 66.

With the indicia 38 arranged in a single column instead of in a double column it is necessary that the six pickup devices 66 be arranged in a single column across the record member 20, as is shown in Fig. 4. The pins 41 to 46 which press against the readers fingers should, however, always be arranged in accordance with the established Braille system of two adjacent columns as shown in Figure 4. To do otherwise would require the operator to learn a new system which is highly disadvantageous.

Figure 5:
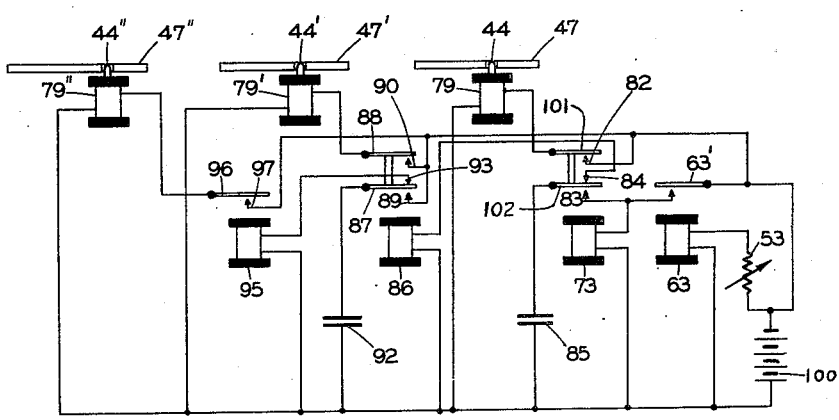
Figure 5 is a detailed circuit diagram of the device.

Figure 5 is a diagram showing one of many possible circuits for actuating, in succession, each of two or more corresponding pins in their separate finger plates. It is to be understood that a complete device would include six circuits each of which is similar to the circuit of Figure 5, for raising simultaneously certain pins in the first finger plate depending upon the letter to be read, then, after a short time delay, for simultaneously raising the corresponding pins in the second finger plate, and then after another short time delay, for simultaneously raising the corresponding pins in a third finger plate. This gives the reader a feel of the letter through three fingers with a slight time delay between feeling the first and second impulses and another slight time delay between feeling the second and third impulses. By the time the third impulse reaches the reader through his third finger the next letter may already be formed on the first bank of pins. The human mind is such that it can segregate these two different pulses and can "presense" the second letter while reading the first letter. The result to an experienced Braille reader is greatly increased reading speed.

In Figure 5 the pickup device is shown as a variable resistance 53 connected to one side of a power supply such as battery 100. A solenoid 63 is connected between the output from the pickup 53 and the other side of the battery 100 so that upon a decrease in the resistance of the pickup 53 indicative of the passing of an indicia underneath the pickup the solenoid 63 is energized thereby causing the switch 63' to close. This connects the battery 100 through solenoid 73 causing switch blades 101, 102 to close against contacts 82, 83 respectively. Closing switch blade 101 against contact 82 connects the battery 100 through solenoid 79 causing the pin 44 to extend up through the finger plate 47. Pin 44, together with the other pins which extend up through finger plate 47, as shown in Figure 4, give the reader his first sense of the letter which is to be read. Simultaneously with the closing of switch 101, 82 the switch blade 102 engages the contact point 83. This, through switch blades 63', 81, connects battery 100 to a condenser 85 and current therefrom charges the condenser.

Upon the resistance of the pickup 53 increasing, signifying the passing of the indicia on the tape through the pickup head, the natural bias on the switch blade 63' causes it to spring open and break the circuit through solenoid 73. Switch blades 101, 102 break away from contact points 82, 83, respectively, thereby breaking the circuit through solenoid 79 causing pin 44 to drop and also breaking the circuit through condenser 85. When switch blade 102 returns to its normal position it engages contact point 84.

This connects the charged condenser 85 to a solenoid 86. Solenoid 86, upon being energized, closes the switch blades 87, 88 against contact points 89, 90, respectively. Closing switch 88, 90 connects solenoid 79' to the battery 100 and causes the pin 44' to rise above the finger plate 47'. Closing switch 87, 89 connects a condenser 92 to the battery 100, thereby charging the condenser 92. When the condenser 85 discharges through solenoid 86, the bias on the switch arms 87, 88 returns them to their normal position, causing the switch arm 87 to engage the contact 93, and breaking the contacts between arm 88 and point 90 and between arm 87 and point 89. Breaking the circuit through point 90 and switch arm 88 allows the pin 44' to fall, and making the contact between switch arm 87 and contact point 93 connects the fully charged condenser 92 to the solenoid 95. This causes the switch arm 96 to engage the contact point 97 and connects the battery 100 to the solenoid 79'' and raises the pin 44'' above the finger plate 47''. When the condenser 92 is discharged the bias on the switch arm breaks its contact with point 97 and allows the pin 44'' to drop.

While the pin 44'' is being raised and lowered, a second series of impulses can be in progress through the series of pins 44, 44' and 44''.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a reader for the blind including a long narrow record member carrying indicia representative of a succession of letters; a device for reading said indicia comprising pickup means for sensing said indicia, means for driving said record member past said pickup means, electric circuit means connected to said pickup means and controlled by said pickup means in accordance with the indicia sensed by said pickup means, a first bank and a second bank of plungers each comprised of a plurality of movable plungers, said electric circuit means including plunger actuating means for actuating said plungers in accordance with electric current in said controlled electric circuit means for indicating to the reader by the sense of feeling the succession of letters which pass said pickup means, and time delay means in said electric circuit means for delaying the actuation of said second bank of plungers with respect to the actuation of said first bank of plungers.

2. A reader for the blind as set forth in claim 1, further characterized by said time delay means comprising condenser means.

3. In a reader for the blind including a long narrow record member carrying indicia representative of a succession of letters and means for driving said record member: pickup means for sensing said indicia as said record member is driven past said pickup means, electric circuit means connected to said pickup means and controlled in accordance with the indicia sensed, a first indicator bank comprising a plurality of movable indicators, a second indicator bank comprising a plurality of movable indicators, said electric circuit means being connected to said first and to said second indicator banks and including indicator actuating means for actuating said indicators in accordance with electric current in said controlled electric circuit means, and time delay means in said electric circuit means for delaying the actuation of one bank of indicators with respect to the actuation of the other bank of indicators.

RALPH B. NOTTINGHAM.

REFERENCES CITED

The following references are of record in the file of this patent:

UNITED STATES PATENTS

| Number | Name | Date |
|---|---|---|
| 1,178,991 | Brown | Apr. 11, 1916 |
| 1,487,115 | McQuarrie | Mar. 18, 1924 |
| 1,889,576 | Snook | Nov. 29, 1932 |
| 2,432,123 | Potter | Dec. 9, 1947 |